United States Patent
Paranjape et al.

(10) Patent No.: US 8,832,830 B2
(45) Date of Patent: Sep. 9, 2014

(54) SECURING NETWORK COMMUNICATIONS FROM BLIND ATTACKS WITH CHECKSUM COMPARISONS

(75) Inventors: Prashant A. Paranjape, Bangalore (IN); David R. Marquardt, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 221 days.

(21) Appl. No.: 13/305,617

(22) Filed: Nov. 28, 2011

(65) Prior Publication Data

US 2013/0139252 A1    May 30, 2013

(51) Int. Cl.
H04L 29/06    (2006.01)

(52) U.S. Cl.
CPC .......... *H04L 63/1466* (2013.01); *H04L 63/123* (2013.01); *H04L 63/1416* (2013.01); *H04L 63/1458* (2013.01); *H04L 63/166* (2013.01); *H04L 6/3236* (2013.01)
USPC ................ 726/22; 726/23; 713/151; 713/181

(58) Field of Classification Search
CPC ............ H04L 63/1416; H04L 63/1458; H04L 63/1466; H04L 63/166; H04L 63/123; H04L 9/3223; H04L 9/3236
USPC ............................... 726/22, 23; 713/151, 181
See application file for complete search history.

(56) References Cited

U.S. PATENT DOCUMENTS

| 6,772,334 | B1 * | 8/2004 | Glawitsch ...................... 713/153 |
| 7,069,438 | B2 * | 6/2006 | Balabine et al. ............... 713/168 |
| 7,284,272 | B2 * | 10/2007 | Howard et al. .................. 726/22 |
| 7,356,587 | B2 * | 4/2008 | Boulanger et al. ............ 709/224 |
| 7,373,663 | B2 * | 5/2008 | Robert ............................ 726/22 |

(Continued)

FOREIGN PATENT DOCUMENTS

WO    WO 2006082507 A1 *    8/2006

OTHER PUBLICATIONS

Microsoft Computer Dictionary, "checksum", Microsoft Press, Mar. 15, 2002, 1 page.*

(Continued)

*Primary Examiner* — Victor Lesniewski
(74) *Attorney, Agent, or Firm* — Terrile, Cannatti, Chambers & Holland, LLP; Robert W. Holland

(57) ABSTRACT

Blind attacks on a protocol connection, such as a TCP connection, are prevented by inserting checksums computed during protocol connection establishment handshake into data sent through the connection and invalidating data sent through the connection that lacks the protocol setup information checksums. Reset attacks are prevented by invalidating reset requests unless a master checksum computed from the protocol setup information checksums is included with the reset request. Checksums computed from protocol setup information have improved robustness by including a random number with the protocol setup information.

16 Claims, 2 Drawing Sheets

(56) References Cited

U.S. PATENT DOCUMENTS

| | | | |
|---|---|---|---|
| 7,472,416 B2* | 12/2008 | Ramaiah et al. | 726/22 |
| 7,545,810 B2* | 6/2009 | Mynam et al. | 370/392 |
| 7,565,694 B2* | 7/2009 | Appanna et al. | 726/24 |
| 7,613,193 B2 | 11/2009 | Swami et al. | |
| 7,634,655 B2* | 12/2009 | Kaniyar et al. | 713/164 |
| 7,734,776 B2* | 6/2010 | Boulanger et al. | 709/224 |
| 7,921,282 B1* | 4/2011 | Mukerji et al. | 713/151 |
| 7,979,694 B2* | 7/2011 | Touitou et al. | 713/154 |
| 8,127,357 B1* | 2/2012 | Phoha et al. | 726/23 |
| 8,200,957 B1* | 6/2012 | Mukerji et al. | 713/151 |
| 8,245,032 B2* | 8/2012 | Donley et al. | 713/160 |
| 8,380,994 B2* | 2/2013 | Rajan et al. | 713/178 |
| 8,433,808 B1* | 4/2013 | Hong et al. | 709/228 |
| 8,453,208 B2* | 5/2013 | Jiang | 726/3 |
| 2001/0042200 A1 | 11/2001 | Lamberton et al. | |
| 2004/0187032 A1* | 9/2004 | Gels et al. | 713/201 |
| 2006/0067525 A1* | 3/2006 | Hartlage | 380/28 |
| 2011/0131646 A1* | 6/2011 | Park et al. | 726/13 |
| 2011/0154488 A1* | 6/2011 | Rajan et al. | 726/22 |

OTHER PUBLICATIONS

"HMAC", Wikipedia, Accessed via Internet Archive dated Sep. 30, 2011, 5pgs.*

Sun, Changhua; Fan, Jindou; Liu, Bin; "A Robust Scheme to Detect SYN Flooding Attacks", Second International Conference on Communications and Networking in China, Aug. 22-24, 2007, pp. 397-401.*

Chouman, Mohamad; Safa, Haidar; Artail, Hassan; "A Novel Defense Mechanism against SYN Flooding Attacks in IP Networks", Canadian Conference on Electrical and Computer Engineering, May 1-4, 2005, pp. 2151-2154.*

Wei, Guiyi; Gu, Ye; Ling, Yun; "An Early Stage Detecting Method against SYN Flooding Attack", International Symposium on Computer Science and its Applications, Oct. 13-15, 2008, pp. 263-268.*

* cited by examiner

SECURING NETWORK COMMUNICATIONS FROM BLIND ATTACKS WITH CHECKSUM COMPARISONS

BACKGROUND OF THE INVENTION

1. Field of the Invention

The present invention relates in general to the field of network communications, and more particularly to a system and method for securing network communications from blind attacks with checksum comparisons.

2. Description of the Related Art

The Transport Control Protocol (TCP) is a stream delivery service that allows segments of data to be sent between computing nodes over a network with the Internet Protocol (IP). TCP re-assembles segments at a receiving node by requesting re-transmission of lost packets from the sending node and re-arranging out-of-order data. TCP provides accurate delivery of a segment although some delays may occur during performance of re-transmission and ordered re-assembly function. Other types of protocols are available for use instead of TCP. Real-Time Transport Protocol (RTP) is typically used for time-sensitive data delivery, such as voice and video packet streaming. User Datagram Protocol (UDP) is typically used for request response interactions.

A host computing node (server) and client computing node establish a TCP connection with a three-way handshake. The client initiates the connection with a SYN sent to the server setting a segment's sequence number to a random value and including a checksum, hereinafter referred to as $\{c1\}$. The server responds with a SYN-ACK that includes an acknowledgement which increments the sequence number, with a random number for the server's sequence and a checksum, hereinafter referred to as $\{c2\}$. The client completes the handshake with an ACK that increments the sequence and acknowledgment numbers and includes a third checksum, hereinafter referred to as $\{c3\}$. The checksums of each handshake (i.e., syn, syn-ack and ack) are used verify the validity of the data at the node that receives the associated portion of the handshake. After a TCP connection is established, data is transferred and then the connection is closed.

During data transfers of an established TCP connection, hackers using malicious code sometimes attempt "blind" attacks with packet-spoofing techniques that cause data corruption and/or connection resets. Blind attacks rely on an attackers ability to guess or know the "five-tuple" of a TCP instance, i.e., the protocol, source address, source port, destination address and destination port. Of the five-tuple, the host IP address, well-known port and client IP address are generally accurately guessed; however, the ephemeral port of the client, the initial sequence, acknowledgement and timestamp fields of the TCP client are typically more difficult to guess and in addition are generally randomized Randomization of a source port number may be performed with an algorithm, however, source port randomization tends to fragment available ephemeral port range and increase the risk of connection-id collisions that lead to connection failures. Generally, port randomization tends to impact connection performance and makes debugging and sniffing for network investigation more difficult. Simplified port randomization techniques, such as with incremented port-ids, tend to fail in a hostile environment. Randomization of initial sequence, acknowledgement sequence and timestamp information tends to increase connection overhead, resulting in greater complexity and reduced performance.

SUMMARY OF THE INVENTION

Therefore, a need has arisen for a system and method which offers protection from blind attacks against a protocol connection between networked nodes.

In accordance with the present invention, a system and method are provided which substantially reduce the disadvantages and problems associated with previous methods and systems for protecting network protocol connections against blind attacks. Checksums computed from protocol setup information exchanged between network nodes during setup of a protocol connection are inserted in data communicated between the network nodes with the protocol connection in order to validate the data.

More specifically, first and second network nodes establish a TCP connection with a protocol connection module at each network node to perform a syn, syn-ack, ack TCP connection establishment handshake. A checksum storage module at each network node stores checksums associated with each of the syn, syn-ack and ack segments of the TCP connection handshake. In one embodiment, the syn, syn-ack and ack segment checksums are made more robust by a random number generator at each network node that includes a random number in the TCP option of the syn, syn-ack and ack segments that are used to compute the checksums. After the TCP connection is established, a data validation module at each network node inserts one of the syn, syn-ack and ack checksums with an identifier into data sent from the node through the TCP connection, such as the TCP option of data packets. The data validation module at a receiving network node invalidates data received that does not include one of the connection setup checksums and associated identifier by comparing any received checksum with checksum stored by the checksum storage module. In one embodiment, a master checksum computed from the setup checksum values is required with any reset received at a network node before the data validation module will allow a reset of the TCP connection.

BRIEF DESCRIPTION OF THE DRAWINGS

The present invention may be better, and its numerous objects, features and advantages made apparent to those skilled in the art by referencing the accompanying drawings. The use of the same reference number throughout the several figures designates a like or similar element.

DETAILED DESCRIPTION

Figure 1:
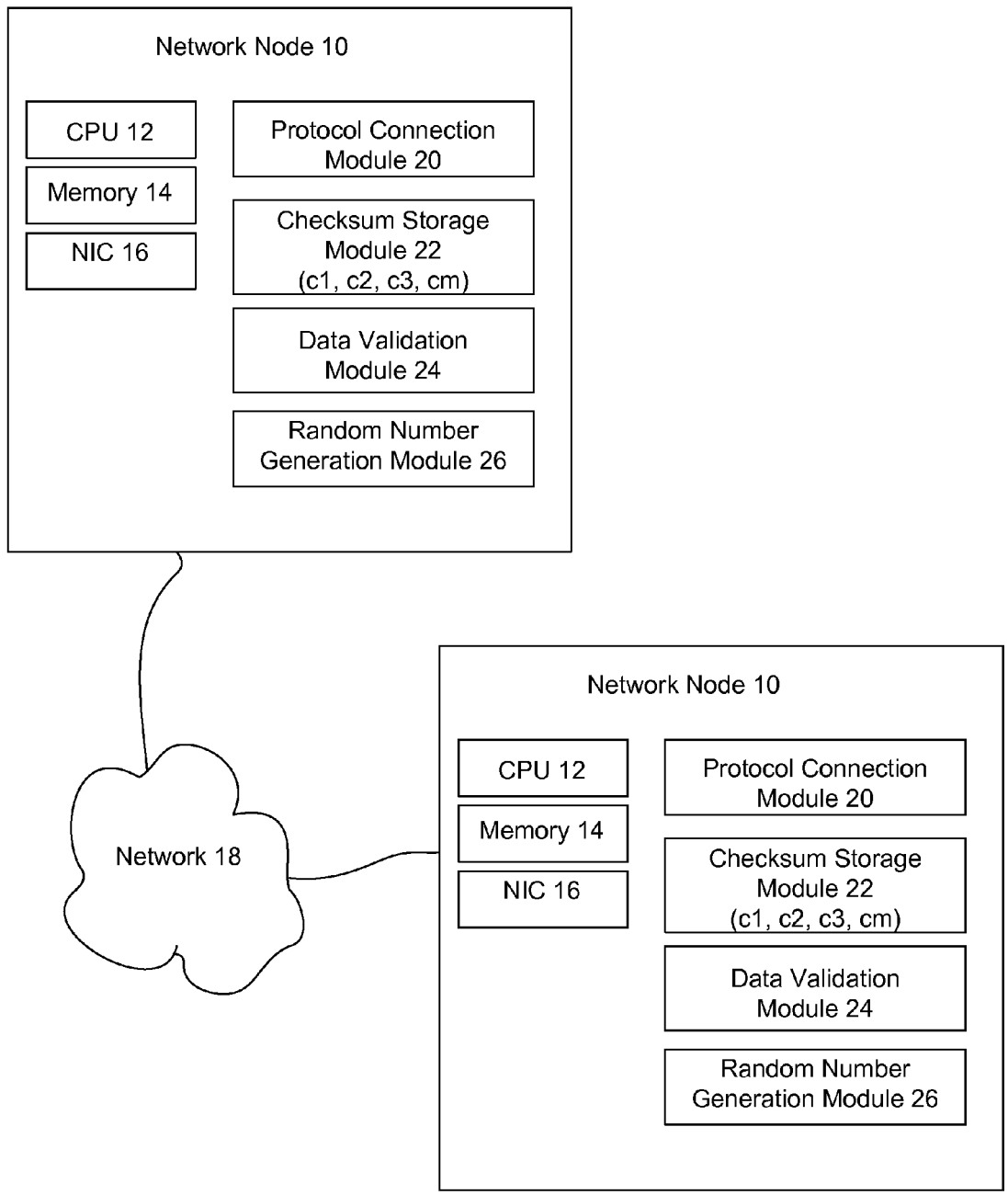
FIG. 1 depicts a block diagram of networks nodes interfaced through a TCP connection protected from blind attacks.

A system and method provides protection from blind attacks against network protocol connections, such as a TCP connection established between first and second network nodes. Connection setup checksum values are stored at each network node and used in data communications made through the connection to indicate the validity of data transferred through the connection. The connection setup checksum values are made more robust by including random numbers in the connection setup segments that are used to establish the connection. Protection against reset attacks is provided by requiring a master checksum with any reset made at the connection. For example the master checksum is computed by the checksum algorithm applied to the connection setup checksums.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a block diagram depicts networks nodes 10 interfaced through a TCP connection protected from blind attacks. Network nodes are, for instance server computing systems that host information or client computing systems that interface with server computing systems to retrieve information. Each network node includes a processor 12 to process information, memory 14 to store information and a network interface card 16 to communicate with a network 18, such as the Internet. For example, a first network node 10 acts as a client and includes a browser application executing on processor 12 that retrieves information into memory 14 through network interface card 16 using TCP/IP communications through network 18. A second network node 10 acts as a host and includes a host application executing on processor 12 to send information from memory 14 through network interface card 16 to clients interfaced with network 18.

Network nodes 10 establish protocol connections between each other with protocol connection modules 20 executing with processing and memory resources of the network node, such as processor 12 or processing resources within network interface card 16. For example, protocol connection module 20 establishes a TCP connection using a conventional handshake in which a first network node sends a syn segment with a TCP packet header, a second network node sends a syn-ack segment with a TCP packet header in response to the syn segment, and the first network node sends an ack segment with a TCP packet header in response to the syn-ack segment. In order to protect the established TCP connection from blind attacks, each network node 10 also includes a checksum storage module 22, a data validation module 24 and a random number generation module 26. Modules 22, 24 and 26 are, for example, software or firmware instructions that execute on processing resources and memory of network nodes 10, such as processor 12, memory 14 or processing resources of network interface card 16.

Checksum storage module 22 on each network node 10 of a TCP connection retrieves and stores the checksum of each connections setup packet sent during connection setup, such as the checksum c1 included in the syn segment packet, the checksum c2 included in the syn-ack segment packet and the checksum c3 included in the ack segment packet. Each checksum c1, c2 and c3 are computed and included in connection setup packets in order to verify that packets are accurately transmitted. In addition, master checksum cm is computed over (c1, c2, c3) locally at the end-points and stored. By storing the checksums c1, c2, c3 and cm for the duration of the TCP connection, checksum storage module 22 makes the checksums available for use in verifying that data packets sent through the connection are from a valid network node 10. In addition, each checksum is stored in association with an identifier, such as the stamps 1, 2, and 3 respectively.

Random number generation module 26 generates random numbers for inclusion in the connection setup packets so that the checksums computed from the connection setup packets will be more robust and difficult to guess. For example, each of the syn, syn-ack and ack segment packets will have its own random number generated by random number generation module 26 as a 32-bit random number.

| Kind = TBD_IBM_KIND | Length = 8 | Stamp = 0 |
|---|---|---|
| <32-bit random number to make check sum in SYN, SYN-ACK, ACK packets more robust> | | |

The random number is inserted in the TCP-option portion of each the three connection setup packets in the TCP three-way handshake. Including the random number ensures that a blind attacker cannot trivially compute the checksums of the TCP connection setup packets. The TCP 16 bit checksum computation includes TCP header information, TCP options information and some IP fields plus data as set forth in RFC 793, section 3.1, section "options."

| IP header + ext headers | TCP headers + options | TCT DATA segment |
|---|---|---|

Data validation module 24 on each network node 10 applies the checksums c1, c2, and c3 to provide the network nodes a way of validating that data packets received through a TCP connection do not originate from a blind attack. Data validation module 24 on a sending network node includes one the checksums in the packet identifier TCP option of data sent from the network node plus an identifier for the included checksum. For example, a data packet of the TCP connection includes the value c1 in the TCP option header with a stamp identifier indicating which checksum value is included. Data validation module 24 on the receiving network node extracts the checksum and stamp identifier from the TCP option header portion and confirms that the checksum value c1 stored by checksum storage module 22 and identified by the stamp identifier matches the checksum included in the data packet.

| Kind = TBD_IBM_KIND | Length = 8 | Stamp = 1, 2, 3, 4 |
|---|---|---|
| <Unused> | | <One of 16-bit checksum from {c1, c2, c3}> |

If the checksum value extracted from the data packet matches the associated checksum value for the stamp identifier stored at the receiving network node, then the data is valid. If the checksum is not included or does not match, the data is considered invalid, such as might be sent as part of a blind attack.

In addition, data validation module 20 at each network node 10 computes a master checksum by applying the checksum algorithm to the three checksum values c1, c2 and c3. The syn packet checksum is stored with the stamp identifier 1, the syn-ack packet checksum is stored with the stamp identifier 2, the ack packet checksum is stored with the stamp identifier 3 and the master checksum cm is stored with the stamp identifier 4. As set forth above, during data transfer the sender network node 10 includes with the data one of checksum c1, c2 or c3 and its associated identifier stamp so that the receiver network node can match the include checksum by the stamp identifier to the values stored at the network node during the connection setup. By accepting only those data packets that have a matching checksum c1, c2 or c3, the receiving node avoids "corruption" blind attacks that attempt to send invalid data. Thus, blind attackers must guess checksum values stored during connection setup in order to execute corruption attack, a task made difficult by including a random number with the connection setup information used to calculate the checksums. The master checksum value is not sent through the protocol connection unless a reset segment is required. By withholding the master checksum until a reset packet is sent, the network nodes 10 avoid connection reset blind attacks. Blind attackers attempting to send a reset packet will have to guess all three checksums and apply the three connection setup checksums to the appropriate checksum algorithm in order to have a reset packet accepted as valid.

Figure 2:
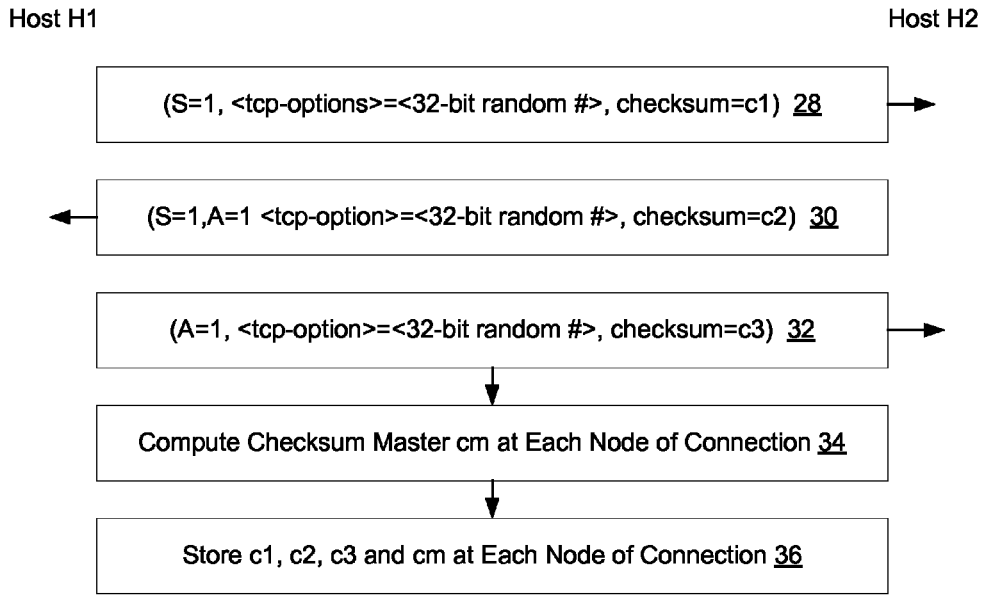
FIG. 2 depicts a flow diagram of a process for setting up a TCP connection with stored connection setup checksums.

Referring now to FIG. 2, a flow diagram depicts a process for setting up a TCP connection with stored connection setup checksums. The process begins at step 28 with a connect setup packet sent from a first network node host to a second network node host, such as a syn connection packet with TCP options header value populated by a 32-bit random number and a syn checksum calculated with the header including the random number. At step 30, the second network host responds to the syn connection packet with a syn-ack connection packet with TCP options header value populated by a 32-bit random number and a syn-ack checksum calculated with the header and the random number. At step 34, the first network host responds to the syn-ack connection package with an ack connection packet with TCP options header value populated by a 32-bit random number and an ack checksum calculated with the header and the random number. At step 34, a master checksum is calculated from the syn, syn-ack and ack checksums by applying the connection checksum values to the checksum algorithm. At step 36, the four checksum values are stored at the network node for use over the duration of the protocol connection.

Figure 3:
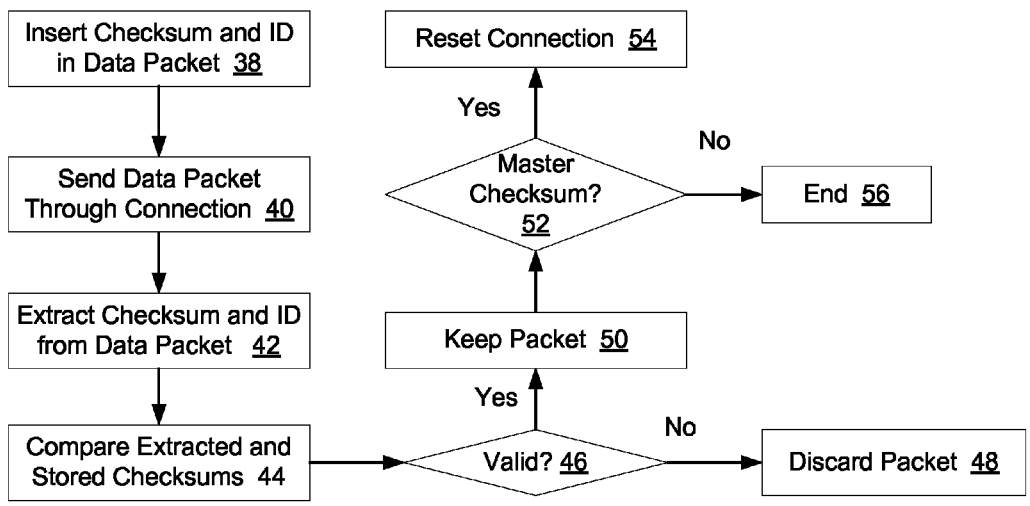
FIG. 3 depicts a flow diagram of a process for validating data received at a network node through a TCP connection protected from blind attacks.

Referring now to FIG. 3, a flow diagram depicts a process for validating data received at a network node through a TCP connection protected from blind attacks. The process begins at step 38 by inserting one of the four stored checksums in a packet to be sent over the TCP connection along with the stamp identifier for the inserted checksum. The master checksum is only included to validate a connection reset packet. At step 40, the packet is sent through the TCP connection to a receiving node. At step 42, the receiving node extracts the checksum and stamp identifier from the packet. At step 44, the checksum and identifier from the packet are compared with the checksum and associated identifier stored at the receiving node to determine if a match exists. If the received and stored checksums as associated by the stamp identifier do not match each other, the process continues to step 48 where the packet is discarded and protective measures for a suspected attack may be taken. If at step 46 the received and stored checksums match, the process continues to step 50 where the packet is validated. At step 52, the checksum is checked if it is a master checksum and, if so, at step 54 the TCP connection is reset. Although the example embodiment details operations with a TCP connection, other types of protocol connections may be supported with appropriate modifications, such as UDP and RTP connections.

Although the present invention has been described in detail, it should be understood that various changes, substitutions and alterations can be made hereto without departing from the spirit and scope of the invention as defined by the appended claims.

What is claimed is:

1. A method for communicating between network nodes with a protocol, the method comprising:
   sending plural protocol connection packets between the network nodes, the protocol connection packets having connection information and at least two checksums;
   storing the checksums at the network nodes, each checksum having an associated identifier;
   establishing a protocol connection between the network nodes using the connection information;
   sending data from a first of the network nodes to a second of the network nodes, the data having one of the checksums and associated identifier;
   validating the data by comparing the checksum and associated identifier received in the data packet with the checksum and associated identifier stored at the second network node;
   wherein the protocol comprises TCP and the plural protocol connection packets comprise syn, syn-ack and ack segments;
   the method further comprising:
      a master checksum stored at each network node, the master checksum built from the syn segment checksum, the syn-ack segment checksum and the ack segment checksum;
      generating a reset at the first network node;
      inserting the master checksum in the reset;
      sending the reset from the first network node to the second network node;
      performing the reset at the second network node only if the reset master checksum matches the checksum stored at the second network node.

2. The method of claim 1 further comprising:
   receiving data at the second network node;
   determining that the data does not include one of the checksums; and
   in response to determining, invalidating the data.

3. The method of claim 1 further comprising:
   generating a random number at one or more of the network nodes; and
   including the random number in at least one of the plural protocol connection packets for use in the checksum of the protocol connection packet.

4. The method of claim 1 further comprising:
   applying the checksums at each of the network nodes to create a master checksum; and
   invalidating a reset packet received at a network node unless the reset packet includes the master checksum.

5. The method of claim 1 wherein the checksums comprise a checksum of the syn segment, a checksum of the syn-ack segment and a checksum of the ack segment.

6. The method of claim 5 wherein each of the syn segment, syn-ack segment and ack segment comprises a random number inserted in a TCP option.

7. The method of claim 1 wherein the protocol comprises UDP.

8. A method for communicating through a network with TCP, the method comprising:
   establishing a TCP connection by exchanging syn, syn-ack and ack segments between first and second network nodes, each of the syn, syn-ack and ack segments including a checksum;
   storing the syn, syn-ack and ack segment checksums at each of the first and second network nodes;
   sending data from the first network node to the second network node, the data including one of the syn, syn-ack and ack segment checksums and an identifier that identifies which of the syn, syn-ack and ack segment checksums is included; and
   confirming the data as valid for the TCP connection at the second network node by comparing the included one of the syn, syn-ack and ack segment checksums as indicated by the identifier with the syn, syn-ack and ack checksums stored at the second network node;
   the method further comprising:
      applying the syn, syn-ack and ack segment checksums at each of the first and second network nodes to compute a master checksum;
      storing the master checksum at each of the first and second network nodes; and
      invalidating a reset for the TCP connection received at the first or second network nodes unless the reset includes the master checksum.

9. The method of claim 8 wherein the sending data further comprises including one of the syn, syn-ack and ack segments checksums as a packet identifier TCP option.

10. The method of claim 8 further comprising including a random number in each of the syn, syn-ack and ack segments that are used to compute the checksums.

11. The method of claim 8 further comprising invalidating data for the TCP connection received at the first or second network nodes unless the data includes one of the syn, syn-ack and ack segments.

12. The method of claim 8 wherein the establishing a TCP connection by exchanging syn, syn-ack and ack segments between first and second network nodes, each of the syn, syn-ack and ack segments including a checksum further comprises inserting a random number as TCP option data in the syn, syn-ack and ack segments, the random number included in the checksum computation for the syn, syn-ack and ack segments.

13. A system for preventing blind attacks on a protocol connection, the system comprising:
   a non-transitory storage medium;
   instructions stored in the non-transitory storage medium, the instructions configured as:
   a checksum storage module operable to store checksums communicated between network nodes with protocol connection setup information used to establish a protocol connection; and
   a data validation module interfaced with the checksum storage module and operable to insert one of the stored checksums and an identifier for the one stored checksum in data sent through the established protocol connection, the data validation module further operable to extract a checksum and identifier from data received through the established protocol connection, to compare the extracted checksum and identifier with the stored checksums to validate or invalidate the received data, to compute a master checksum from the checksums and to invalidate a reset received unless the reset includes the master checksum.

14. The system of claim 13 wherein the protocol comprises TCP and the checksums comprise a syn checksum, a syn-ack checksum and an ack checksum.

15. The system of claim 14 wherein the data validation module inserts one of the stored checksums as a packet identifier in the TCP option.

16. The system of claim 14 further comprising a random number generator operable to insert a random number in the TCP protocol connection setup information so that the checksums are computed with the random number.

* * * * *